(12) United States Patent
Bandic et al.

(10) Patent No.: US 10,373,528 B2
(45) Date of Patent: Aug. 6, 2019

(54) CELL-LEVEL REALIZATION OF BURN AFTER READING FOR NAND FLASH

(71) Applicant: Western Digital Technologies, Inc., Irvine, CA (US)

(72) Inventors: Zvonimir Z. Bandic, San Jose, CA (US); Robert Eugeniu Mateescu, San Jose, CA (US); Minghai Qin, San Jose, CA (US); Chao Sun, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 279 days.

(21) Appl. No.: 15/379,216

(22) Filed: Dec. 14, 2016

(65) Prior Publication Data

US 2018/0165993 A1 Jun. 14, 2018

(51) Int. Cl.
| | |
|---|---|
| *G06F 11/00* | (2006.01) |
| *G09C 1/00* | (2006.01) |
| *G06F 11/10* | (2006.01) |
| *G11C 29/52* | (2006.01) |
| *G11C 29/04* | (2006.01) |

(52) U.S. Cl.
CPC ............ *G09C 1/00* (2013.01); *G06F 11/1048* (2013.01); *G11C 29/52* (2013.01); *G11C 2029/0409* (2013.01); *G11C 2029/0411* (2013.01)

(58) Field of Classification Search
CPC ................. G06F 11/1048; G11C 29/52; G11C 2029/0409
See application file for complete search history.

(56) References Cited

U.S. PATENT DOCUMENTS

| | | | | |
|---|---|---|---|---|
| 8,239,617 B1* | 8/2012 | Linnell | ............... | G06F 12/0246 711/103 |
| 8,621,145 B1* | 12/2013 | Kimmel | ............. | G06F 12/0246 711/103 |
| 8,848,439 B2* | 9/2014 | Zhang | ................. | G11C 11/5642 365/185.03 |
| 8,850,207 B2 | 9/2014 | Kato et al. | | |
| 8,938,624 B2 | 1/2015 | Obukhov et al. | | |
| 8,938,659 B2* | 1/2015 | Wu | ..................... | G06F 11/1068 714/47.2 |
| 9,069,703 B2 | 6/2015 | Raam | | |
| 9,152,505 B1 | 10/2015 | Brooker et al. | | |

(Continued)

OTHER PUBLICATIONS

Michael Abraham; Flash Memory Summit; Physical NAND Flash Security: Preventing Recovery of Deleted Data; dated Aug. 2011, 29 total pages.

(Continued)

*Primary Examiner* — Esaw T Abraham
(74) *Attorney, Agent, or Firm* — Vierra Magen Marcus LLP

(57) ABSTRACT

The present disclosure generally relates to a method of burning a file in a memory device after the file has been read. Once a file has been read, an algorithm uses the memory device to create errors that the error correction code (ECC) cannot decode the error. In creating the error, the entire word line is destroyed physically rather than logically so that retrieving information from that particular word line is no longer possible. In creating the error, adjacent word lines are not affected. The error renders the file burned.

32 Claims, 6 Drawing Sheets

(56) References Cited

U.S. PATENT DOCUMENTS

| | | | |
|---|---|---|---|
| 9,164,891 B2* | 10/2015 | Karamcheti | G06F 3/061 |
| 9,317,422 B1 | 4/2016 | Winters et al. | |
| 9,654,144 B2* | 5/2017 | Parthasarathy | H03M 13/152 |
| 9,870,834 B2* | 1/2018 | Li | G11C 29/44 |
| 9,984,768 B2* | 5/2018 | Hyun | G11C 29/52 |
| 2014/0022849 A1 | 1/2014 | Krutzik et al. | |
| 2016/0093395 A1 | 3/2016 | Liu et al. | |
| 2016/0099810 A1 | 4/2016 | Li et al. | |

OTHER PUBLICATIONS

Paul Ducklin; Snapchat images that have "disappeared forever" stay right on your phone . . . ; dated May 10, 2013; 16 total pages.

Shawn Knight; These self-destructing SSDs will physically destroy the NAND flash on your command; dated Oct. 1, 2014; 6 total pages.

* cited by examiner

| | 606A | 606B | 606C | 606D | 606E | 606F | 606G | |
|---|---|---|---|---|---|---|---|---|
| | 1 | 1 | 0 | 1 | 1 | 0 | 1 | ← 602A |
| | 0 | 0 | 0 | 0 | 0 | 0 | 0 | ← 604A |
| | 3 | 3 | 2 | 3 | 3 | 2 | 3 | ← 608A |
| | 1 | 0 | 0 | 0 | 0 | 0 | 0 | ← 602B |
| | 1 | 0 | 1 | 1 | 1 | 0 | 0 | ← 604B |
| | 0 | 2 | 1 | 1 | 1 | 2 | 2 | ← 608B |
| | 1 | 1 | 1 | 0 | 1 | 1 | 0 | ← 602C |
| | 0 | 0 | 0 | 0 | 0 | 0 | 0 | ← 604C |
| | 3 | 3 | 3 | 2 | 3 | 3 | 2 | ← 608C |

FIG. 6A

| | 606A | 606B | 606C | 606D | 606E | 606F | 606G | |
|---|---|---|---|---|---|---|---|---|
| | 1 | 1 | 0 | 1 | 1 | 0 | 1 | ← 602A |
| | 0 | 0 | 0 | 0 | 0 | 0 | 0 | ← 604A |
| | 3 | 3 | 2 | 3 | 3 | 2 | 3 | ← 608A |
| | 1 | 0 | 0 | 0 | 0 | 0 | 0 | ← 602B |
| | 0 | 0 | 0 | 0 | 0 | 0 | 0 | ← 604B |
| | 3 | 2 | 2 | 2 | 2 | 2 | 2 | ← 608B |
| | 1 | 1 | 1 | 0 | 1 | 1 | 0 | ← 602C |
| | 0 | 0 | 0 | 0 | 0 | 0 | 0 | ← 604C |
| | 3 | 3 | 3 | 2 | 3 | 3 | 2 | ← 608C |

FIG. 6B

| | 606A | 606B | 606C | 606D | 606E | 606F | 606G | |
|---|---|---|---|---|---|---|---|---|
| | 1 | 1 | 0 | 1 | 1 | 0 | 1 | ← 602A |
| | 0 | 0 | 0 | 0 | 0 | 0 | 0 | ← 604A |
| | 3 | 3 | 2 | 3 | 3 | 2 | 3 | ← 608A |
| | 0 | 1 | 0 | 0 | 0 | 1 | 1 | ← 602B |
| | 1 | 0 | 1 | 1 | 1 | 0 | 0 | ← 604B |
| | 1 | 3 | 1 | 1 | 1 | 3 | 3 | ← 608B |
| | 1 | 1 | 1 | 0 | 1 | 1 | 0 | ← 602C |
| | 0 | 0 | 0 | 0 | 0 | 0 | 0 | ← 604C |
| | 3 | 3 | 3 | 2 | 3 | 3 | 2 | ← 608C |

FIG. 6C

CELL-LEVEL REALIZATION OF BURN AFTER READING FOR NAND FLASH

BACKGROUND OF THE DISCLOSURE

Field of the Disclosure

Embodiments of the present disclosure generally relate to a method of burning a file in a memory device after the file has been read.

Description of the Related Art

A popular application on solid state devices (SSD), such as cell phones, is providing a file for an end user to view for a predetermined period of time. After the predetermined period of time, the file is then no longer viewable. The end user, and likely the user who provided the file to the end user, believe that because the file is no longer viewable and that no one would ever be able to view the file. Unfortunately, both the user and the end user would be incorrect. What actually occurs is the file is hidden from view.

There are two ways to hide a file from one. One way to hide a file is to move the file to a hidden folder that the end user and original user cannot view. The theory is that the hidden folder can be erased at a later point in time. Of course, if the cell phone (or storage device containing the hidden folder) is lost or falls into the wrong hands, a hacker may be able to recover the file and hence, view the file that was thought to be no longer viewable.

A second way to hide a file is to encrypt the file (or the word line for accessing the file) with an encryption key and then destroy the encryption key after the file has been read. In such a scenario, each file or word line would need a separate encryption key and thus increase hardware complexity when storing encryption keys and also increase storage overhead.

What is needed is a method to burn a file after the file has been read.

SUMMARY OF THE DISCLOSURE

The present disclosure generally relates to a method of burning a file in a memory device after the file has been read. Once a file has been read, an algorithm uses the memory device to create errors so that the error correction codes (ECC) cannot decode the error. In creating the error, the entire word line is destroyed physically rather than logically so that retrieving information from that particular word line is no longer possible. In creating the error, adjacent word lines are not affected. The error renders the file burned.

In one embodiment, a method comprises detecting that a first file disposed in a first memory device has been read, wherein at least a portion of the first file is disposed in a first bit and wherein the first bit is coupled to a first word line; and changing a logic state of the first bit after a first predetermined period of time, wherein the first word line, after changing the logic state, has an ECC of less than 0.9.

In another embodiment, a computer system for storing and retrieving files comprises a processor; and a memory system storing instructions that, when executed by the processor, cause the computer system to: detect that a first file disposed in a first memory device of the memory system has been read, wherein at least a portion of the first file is disposed in a first bit and wherein the first bit is coupled to a first word line; and change a logic state of the first bit after a first predetermined period of time, wherein the first word line, after changing the logic state, has an ECC of less than 0.9.

In another embodiment, a non-transitory computer readable storage medium, containing instructions that, when executed by a processor, cause a computer system to burn files after a read process has been completed, by performing the steps of: detecting that a first file disposed in a first memory device has been read, wherein at least a portion of the first file is disposed in a first bit and wherein the first bit is coupled to a first word line; and changing a logic state of the first bit after a first predetermined period of time, wherein the first word line, after changing the logic state, has an ECC of less than 0.9.

In another embodiment, a device, comprises: means for detecting that a first file disposed in a first memory device has been read, wherein at least a portion of the first file is disposed in a first bit and wherein the first bit is coupled to a first word line; and means for changing a logic state of the first bit after a first predetermined period of time, wherein the first word line, after changing the logic state, has an error correction code (ECC) of less than 0.9.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 6A-6C are schematic illustrations of burn processes for an MLC word line.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a method of burning a file in a memory device after the file has been read. Once a file has been read, an algorithm uses the memory device to create errors so that the ECC cannot decode the error. In creating the error, the entire word line is destroyed physically rather than logically so that retrieving information from that particular word line is no longer possible. In creating the error, adjacent word lines are not affected. The error renders the file burned. Because the file has been burned, there is a cell-level realization of the burn after reading the file. The discussions herein are made with reference to NAND flash memory, but it is to be understood that the embodiments discussed herein may be useful to other types of memory as well and should not be limited to NAND flash unless explicitly stated.

The term "user" as used herein includes, for example, a person or entity that owns a computing device or wireless device; a person or entity that operates or utilizes a computing device or a wireless device; or a person or entity that is otherwise associated with a computing device or a wireless device. It is contemplated that the term "user" is not intended to be limiting and may include various examples beyond those described.

The term "media item" as used herein includes, for example, computer files, data, images, photos, documents, other such electronic media, and other resources for storing information, which is available to a computer program and which may be based on some type of durable storage.

Figure 1:
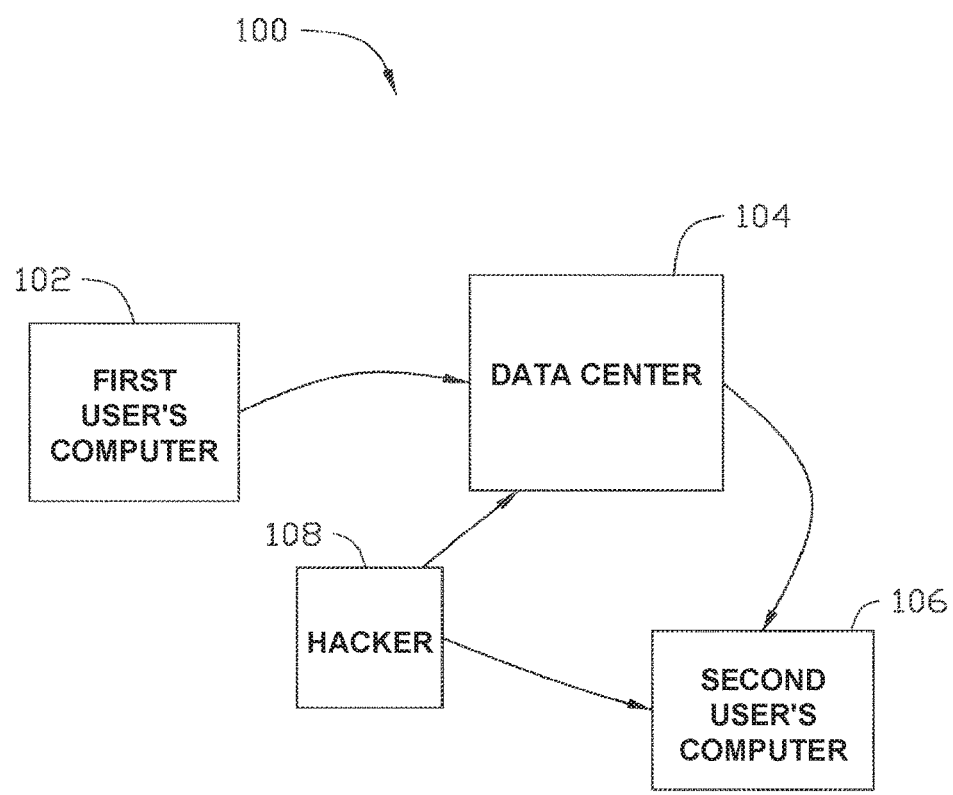
FIG. 1 illustrates an interconnected computer system, according to embodiments described herein.

FIG. 1 illustrates an interconnected computer system 100, according to embodiments described herein. As shown, the computing system 100 includes a first user's computer 102, a data center 104 and a second user's computer 106 (such as an end user's computer). Both the first user's computer 102 and the second user's computer 106 may include conventional components of a computing device, for example, a processor, system memory, a hard disk drive, a battery, input devices such as a mouse and a keyboard, and/or output devices such as a monitor or graphical user interface, and/or a combination input/output device such as a touchscreen which not only receives input but also displays output.

When sharing or sending files from one user to another, the file is sent from the first user's computer 102 to the data center 104 and then to the second user's computer 106. For situations where the sent file is to be no longer viewable after being read, if the file is encrypted or moved to a hidden folder, a hacker 108 may access either the data center 104 or the second user's computer 106 to retrieve the file. The hacker 108 may be able to decode the file from the hidden folder or decode the encryption key to discover and view the file. As discussed above, such a situation is not desirable.

It is noted that the first user's computer 102 and the second user's computer 106 may be a personal computer, laptop mobile computing device, smart phone, video game console, home digital media player, network-connected television, set top box, and/or other computing devices having components suitable for communicating with the data center 104. The first user's computer 102 and the second user's computer 106 may also execute other software applications configured to receive, display, modify, store, and upload media files and other data from the multi-device integration application, such as, but not limited to, text notifications, SMS data, email platforms and other application platforms.

Figure 2:
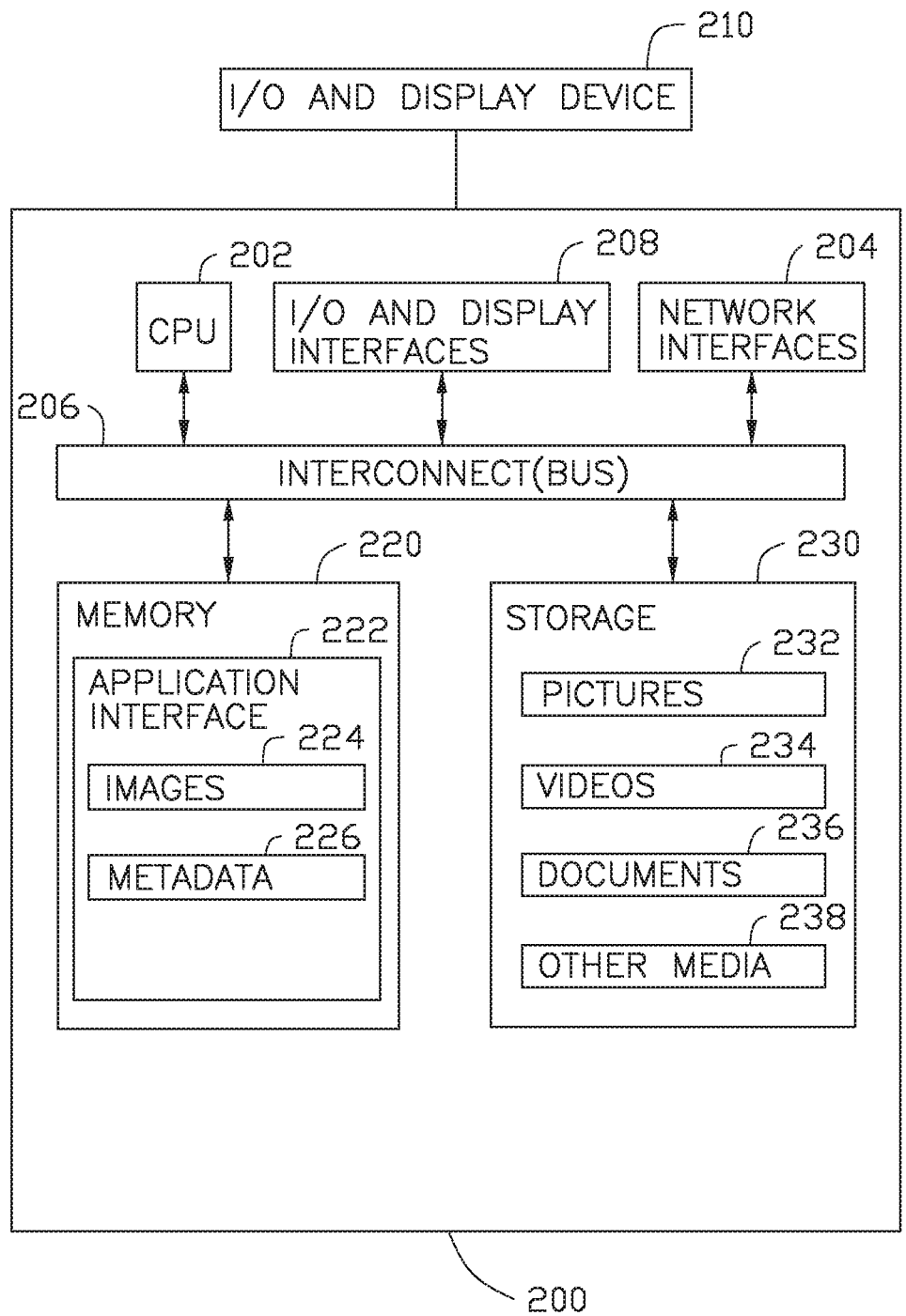
FIG. 2 illustrates an individual user computing system used to access a memory system containing a file to be viewed and then burned, according to embodiments described herein.

FIG. 2 illustrates a user computer 200, such as the first user's computer 102 or second user's computer 106, used to access the data center 104. The user computer 200 may include, without limitation, a central processing unit (CPU) 202, a network interface 204, an interconnect 206, a memory 220, and additional storage 230 such as a memory array. The user computer 102 may also include an I/O device interface 208 connecting I/O devices 210 (for example, keyboard, display, touchscreen, and mouse devices) to the user computer 200.

CPU 202 is included to be representative of a single CPU, multiple CPU's, a single CPU having multiple processing cores, etc., and the memory 220 is generally included to be representative of a random access memory. The interconnect 206 may be used to transmit programming instructions and application data between the CPU 202, I/O device interfaces 208, storage 230, network interface 204, and memory 220. The network interface 204 may be configured to transmit data via the data center 104, for example, to stream, upload/download or otherwise access content. Storage 230, such as a hard disk drive or solid-state storage drive (SSD), may store non-volatile data. The storage 230 may contain pictures 232, videos 234, documents 236, and other media 238. Illustratively, the memory 220 may include an application interface 222, which itself may display images 224, and/or store metadata 226 of images 224.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present example also relates to an apparatus for performing the operations herein. This apparatus may be specially constructed for the illustrated purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system interconnect.

The structure for a variety of these systems will appear from the description above. In addition, the present examples are not described with reference to any particular programming language, and various examples may thus be implemented using a variety of programming languages.

Figure 3:
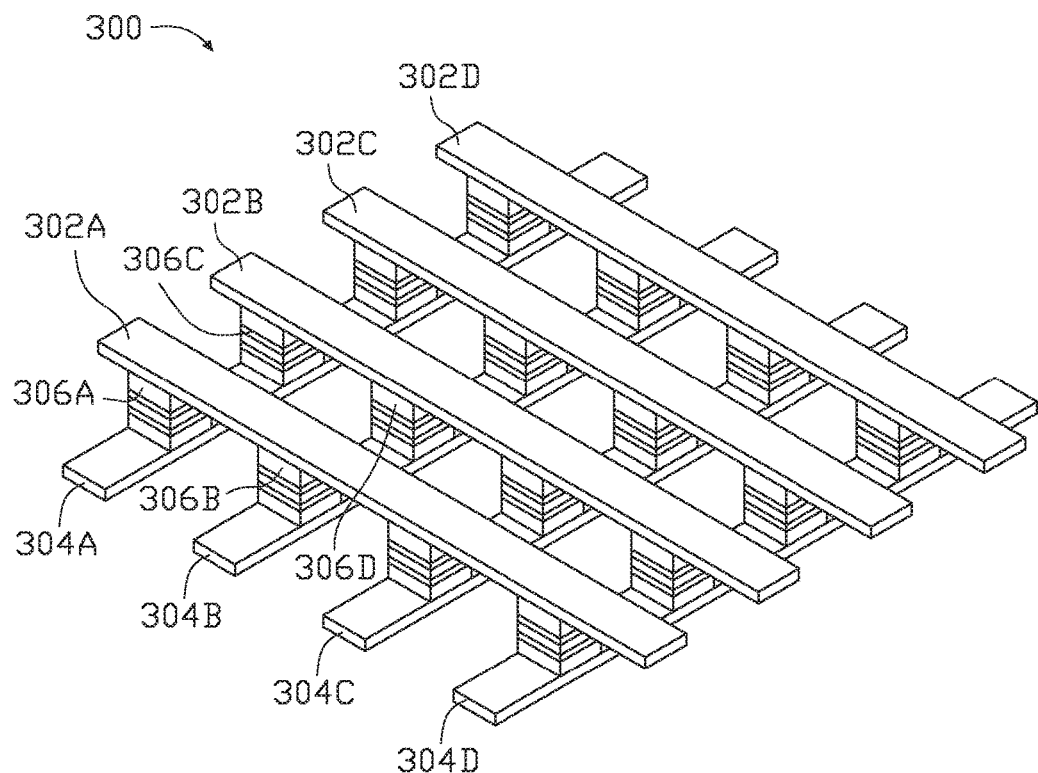
FIG. 3 is a schematic perspective view of a memory array according to one embodiment described herein.

FIG. 3 is a schematic perspective view of a memory array 300 according to one embodiment described herein. A first plurality of parallel lines 302A-302D (such as bit lines) are disposed in a common plane. The second plurality of parallel lines 304A-304D (such as word lines) are disposed in a common plane different the first plurality of parallel lines 302A-302D. The array 300 is arranged such that a first memory cell 306A is coupled to a first line 302A of the plurality of first lines 302A-302D. The first memory cell 306A is also coupled to a first line 304A of the second plurality of parallel lines 304A-304D. A second memory cell 306B is coupled to the first line 302A and a second line 304B of the second plurality of parallel lines 304A-304D. A third memory cell 306C is coupled to a second line 302B of the first plurality of parallel lines 302A-302D. The third memory cell 306C is also coupled to the first line 304A. A fourth memory cell 306D is coupled to both the second line 302B and second line 304B. Each memory cell is accessed by a word line and a bit line, and there are numerous memory cells that share a bit line. Additionally, there are numerous memory cells that share a word line. However, there are no two memory cells that share both a common word line and a common bit line.

Figure 4:
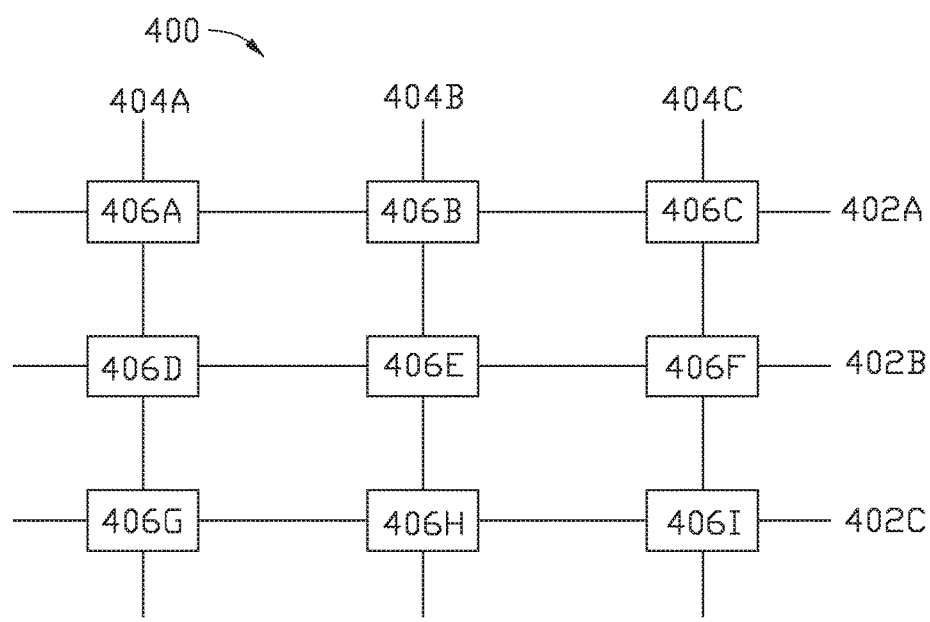
FIG. 4 is a schematic representation of a memory device having a file to be burned according to one embodiment.

FIG. 4 is a schematic representation of a memory device 400 having a file to be burned according to one embodiment. In the embodiment shown in FIG. 4, the memory device is a single level cell (SLC) having a plurality of word lines 402A-402C, a plurality of bit lines 404A-404C and a plurality of memory cells 406A-406I (or bits). It is to be understood that while three word lines 402A-402C have been shown, additional word lines may be present. Similarly, while only three bit lines 404A-404C have been shown, it is to be understood that additional bit lines may be present. Finally, it is also to be understood that while nine memory cells 406A-406I have been shown, additional memory cells may be present due to the presence of additional bit lines and word lines.

There is a capacitance between the memory cells 406A-406I. Specifically, there is a capacitance between the center memory cell 406E and each surrounding memory cell. The capacitance between the center memory cell 406E and the other memory cells 406B, 406H on the same bit line 404B is greater than the capacitance between the center memory cell 406E and the corner memory cells 406A, 406C, 406G, 406I. Similarly, the capacitance between the center memory cell 406E and the other memory cells 406D, 406F on the same word line 402B is greater than the capacitance between the center memory cell 406E and the corner memory cells 406A, 406C, 406G, 406I. In one embodiment, the capacitance between center memory cell 406E and the other memory cells 406D, 406F on the same word line 402B is the same as the capacitance between center memory cell 406E and the other memory cells 406B, 406H on the same bit line 404B. To truly delete the file, the entire word line is destroyed. Assuming the file to be burned utilizes the center memory cell 406E. The memory cell 406E needs to be burned so that an ECC cannot decode the memory cell 406E and discover the file. To burn the memory cell 406E, the entire word line 402B is destroyed.

Figure 5A:
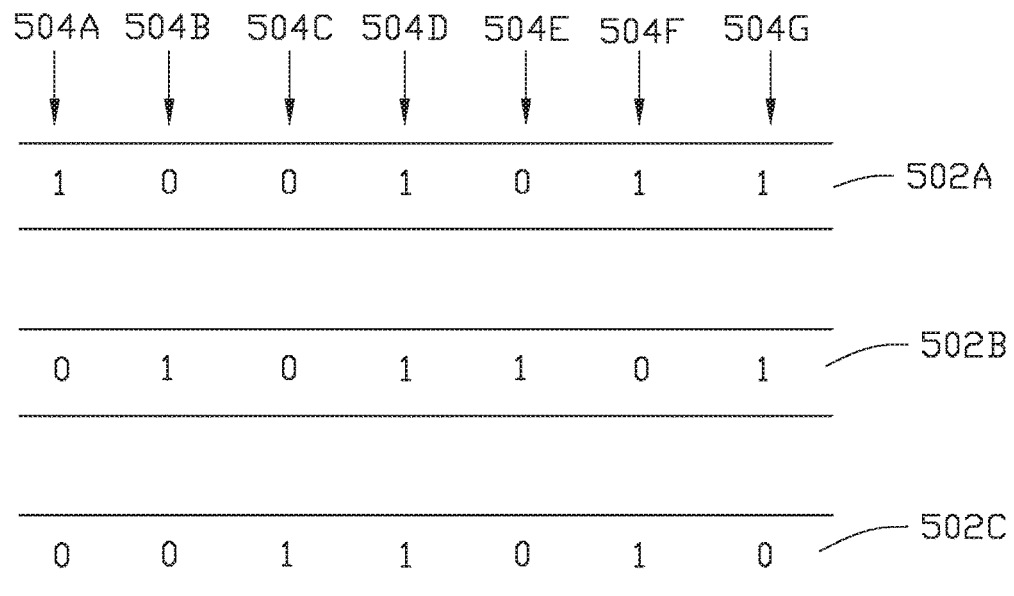
FIGS. 5A and 5B are a schematic illustration of a burn process for an SLC word line according to one embodiment.
Figure 5B:
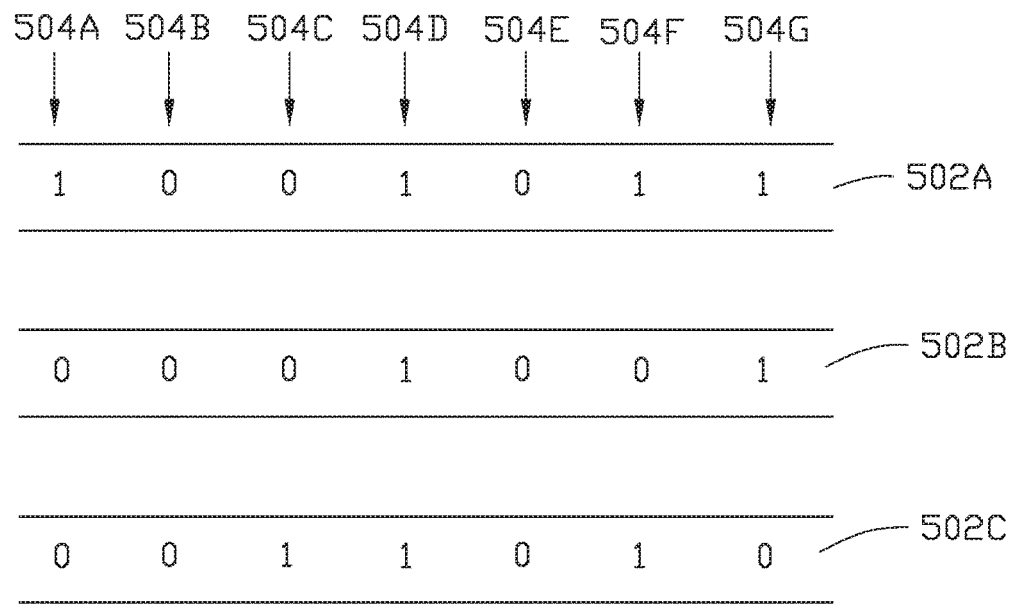

FIGS. 5A and 5B are schematic illustrations of a burn process for a word line according to one embodiment. For FIGS. 5A and 5B, the file to be burned is in a SLC. In FIGS. 5A and 5B, three word lines 502A-502C are shown as are seven bit lines 504A-504G. It is to be understood that additional bit lines and word lines may be present, but simply for exemplification purposes, three word lines and seven bit lines have been shown. Each cross point of a bit line and a word line represents a memory cell. The memory cell in FIGS. 5A and 5B each have a single bit which has a logic digit of either "1" or "0". For exemplification purposes, an example will be discussed whereby a file to be burned is located in word line 502B. There are also files on the adjacent word lines 502A, 502C, but the adjacent word lines 502A, 502C will not be affected by the physical destruction of word line 502B.

For physically destroying the word line 502B, the physical level of the memory cell can only be changed from a lower level to a higher level. In the case of an SLC, that means changing the physical state from "0" to "1" (i.e., a logic state from "1" to "0"). The physical state cannot be changed from "1" to "0" in the physical destruction process because the physical state cannot be lowered. Additionally, during the physical destruction process, it is possible that memory cells in adjacent word lines disposed along the same bit line could be changed from the lower physical state of "0" to the higher physical state of "1". Therefore, in a triplet situation shown in FIG. 5A, a determination is to be made regarding which bit line to utilize for physically destroying the word line 502B. Based upon the above, memory cells along word line 502B having a physical state of "0" can be changed to a physical state of "1". Thus, in determining which bit lines to use in physically destroying the word line 502B, only three bit combinations containing "?1?" may be possible for switching. In regards to word lines 502A, 502C, to ensure that the memory cells in the adjacent word lines 502A, 502C and common bit line are not disturbed, the adjacent memory cells along the bit line should also have a logical state of "0". Therefore, to perform the physical destruction of word line 502B, the bit logic combination of "010" is the combination of choice.

Initially, three word lines having triplet logic bits in the corresponding bit line are read, and it is detected that the file in the middle word line has been read and needs to be burned. The memory is searched to find files having the logic bits of "010" along the corresponding bit line. As can be seen in FIG. 5A, there are two bit lines with the logic bits of "010" with one located along bit line 504B and the other located along bit line 504E. To physically destroy the middle word line 502B, and thus burn the file stored in 502B, a write current is applied to the word line 502B and to the corresponding bit lines 504B, 504E to change the logic state of the middle bit from "1" to "0" (i.e., changing the physical state from "0" to "1"), the results of which are shown in FIG. 5B. Once the word line 502B has been physically destroyed, the raw bit error rate (RBER) is increased to at least 0.125 for the word line 502B. A RBER of at most about 0.01 is considered to be correctable. Hence, the RBER is far above a correctable value. Additionally, the ECC rate required to correct an RBER of 0.125 is less than 0.46, which is far below a reasonable ECC rate for storage which needs to be 0.9 or greater. Therefore, if the hacker were to try and decode the burned files by reading the word line 502B, then because the ECC rate is required to be less than 0.46, the hacker would be unable to decode the word line 502B. If the hacker were to try and decode the burned files by looking for all bit lines having the logic bit arrangement of "0?0", then the ECC rate would be required to be below 0.75 which is still below 0.9. Thus, the word line 502B cannot be decoded after being physically destroyed.

In an SLC, changing the logic state from "1" to "0" changes the physical state from "0" (low) to "1" (high). As discussed above, if the adjacent bits along the bit line have logic state "0" (physical high level), then there is no danger of the adjacent bits changing state too. However, if the adjacent bits along the bit line have a logic state "1" (physical low level) then it is possible that the adjacent bits will change state too which would be undesirable. Therefore, the logic sequence that would be best to change in a three bit set would be "010" changing to "000" for an SLC.

FIGS. 6A-6C are schematic illustrations of burn processes for an MLC word line. In an MLC, there are four different levels for the word lines and hence, each memory cell has two bits and thus four logic states. Therefore, each memory cell will have a possibility of four separate logic states: "11", "10", "00" and "01" ordered from low to high which correspond to physical states "0", "1", "2" and "3" respectively. In regards to FIGS. 6A-6C, there are three upper page word lines 602A-602C and three lower page word lines 604A-604C. It is to be understood that while three upper page word lines 602A-602C and three lower page word lines 604A-604C are discussed, what is actually present are three word lines with each word line having an upper page portion 602A-602C and a lower page portion 604A-604C. The description herein will use the terms "upper page portion 602A-602C", "upper page portion of the word lines 602A-602C" and "word lines 602A-602C" interchangeably. Similarly, the description herein will use the terms "lower page portion 604A-604C", "lower page portion of the word lines 604A-604C" and "word lines 604A-604C" interchangeably. There are also seven bit lines 606A-606G. Therefore, in total, there are twenty one cells (i.e., seven bit lines times three word lines). Furthermore, for ease of understanding (but to be understood to not be physically present as a separate line), imaginary lines 608A-608C representing the physical level of all twenty one cells have been added for each memory cell. The memory cell logic bit-pair is read lower page first followed by the upper page. Hence, the memory cell at the intersection of bit line 606A and word lines 602A, 604A has a logic bit-pair of "01" which corresponds to a physical level of "3". Similarly, the memory cell at the intersection of bit line 606A and word lines 602B, 604B has a logic bit-pair of "11" which corresponds to a physical level of "0". Additionally, the memory cell at the intersection of bit line 606C and word lines 602A, 604A has a logic bit-pair of "00" which corresponds to a physical level of "2". Finally, the memory cell at the intersection of bit line 606C and word lines 602B, 604B has a logic bit-pair of "10" which corresponds to a physical level of "1".

Similar to an SLC arrangement, an MLC changing the physical state can only occur by increasing from "0" to "1", "2" or "3"; from "1" to "2" or "3"; or from "2" to "3". The physical state cannot be changed by lowering from a higher physical state to a lower physical state in the physical destruction process because the physical state cannot be lowered. Similar to SLC, during the physical destruction process, it is possible that memory cells in adjacent word lines disposed along the same bit line could be changed from a lower physical state to the higher physical state. Therefore, in a triplet situation shown in FIG. 6A, a determination is to be made regarding which bit line to utilize for physically destroying the one of the middle word lines 602B, 604B. Based upon the above, memory cells along word lines 602B, 604B having a physical state of "0" can be changed to a higher physical state. Similarly, memory cells along word lines 602B, 604B having a physical state of "1" can be changed to a higher physical state.

Because the files are in an MLC arrangement, there are two possible requirements to burn the files with the middle word lines 602B, 604B. Specifically, either the upper page word line 602B may be burned or the lower page word line 604B may be burned. Of course, both word lines 602B, 604B may be burned, but such a burn would overcomplicate the burn process. Additionally, please note that the top word lines 602A, 604A or the bottom word lines 602C, 604C may be burned instead. The middle word lines 602B, 604B have been chosen for exemplification purposes. The results of the lower page burn process are shown in FIG. 6B. The results of an upper page burn process are shown in FIG. 6C.

In regards to destroying the lower page, in determining which bit lines to use in physically destroying the word line 604B, only three bit combinations containing the physical states of "?1?" or "?0?" may be possible for switching. In regards to word lines 604A and 604C, to ensure that the memory cells in the adjacent word lines 604A and 604C and common bit line are not disturbed, the adjacent memory cells should also have a physical state of "2" or "3" . . . in other words, the memory cells in adjacent word lines along the same bit line should already at a higher state than the memory cells to be burned. Therefore, to perform the physical destruction of word line 604B, the bit logic combinations of "303", "313", "213" and "312" are the combination of choice.

In an example burn process of FIG. 6B, the middle cell along with adjacent bit-line having the memory cell physical levels of "303", "313", "213" or "312" are to be burned after being read. After a detection that files in a word line have been read, a search occurs to find bit lines with the identified physical level triplets. As shown in FIG. 6A, the triplet memory cell group corresponding to bit line 606A has a physical level of "303", the triplet memory cell group corresponding to bit line 606C has the physical level of "213", the triplet memory cell group corresponding to bit line 606D has the physical level of "312" and the triplet memory cell group corresponding to bit line 606E has the physical level of "313".

FIG. 6B shows the result where the lower page word line 604B has been physically destroyed and changed the physical level for the bit line 606A has changed to "333" because the memory cell at the intersection of bit line 606A and word lines 602B, 604B has changed from a logic state of "11" to a logic state of "01". Similarly, the triplet memory cell group corresponding to bit line 606C has been changed to the physical level of "223" because at the intersection of bit line 606C and word lines 602B, 604B the memory cell has changed from a logic state of "10" to a logic state of "00". Additionally, the triplet memory cell group corresponding to bit line 606E has changed to the physical level of "323" because the memory cell at the intersection of bit line 606E and word lines 602B, 604B has changed from the logic state of "10" to a logic state of "00". Finally, the triplet memory cell group correspond to bit line 606D has changed to the physical level of "322" because the memory cell at the intersection of bit line 606D and word lines 602B, 604B has changed from the logic state of "10" to the logic state of "00". To perform the burn process, a write current is applied to the lower page word line 604B and to the corresponding bit lines 606A, 606C, 606D and 606E to change the logic state of the corresponding bits. After the burn process, the RBER is increased to at least 0.0625. As noted above, a RBER of at most about 0.01 is considered to be correctable. Hence, the RBER is far above a correctable value. Additionally, the ECC rate for an RBER of 0.0625 is less than 0.67 which is far below the standard ECC of 0.9. Thus, decoding the word line is not possible. In order to decode by treating the known files as "3?3", "3?2" and "2?3", then the ECC is still less than 0.8125 which is below 0.9. Hence, decoding the file is highly unlikely.

In regards to destroying the upper page word line 602B, determining which bit lines to use in physically destroying the word line 602B is slightly different from destroying the lower page word line 604B. To burn the upper page word line 602B without changing the lower page word line 604B, the upper page can only be burned from physical state "0" (i.e., logic state "11") to physical state "1" (i.e., logic state "10") or from physical state "2" (i.e., logic state "00") to physical state "3" (i.e., logic state "01"). Therefore, to perform the physical destruction of word line 602B, the bit logic combinations of "303", "323", "223" and "322" should be changed, which correspond to bit lines 606A, 606B, 606F and 606G respectively.

FIG. 6C shows the results where the upper page word line 602B has been physically destroyed and changed the physical level for the triplet memory cell group corresponding to bit line 606A to "313" because the memory cell at the intersection of bit line 606A and word lines 602B, 604B has changed from a logic state of "11" to a logic state of "10". Similarly, the triplet memory cell group corresponding to bit line 606B has been changed to the physical level of "333" because at the intersection of bit line 606B and word lines 602B, 604B the memory cell has changed from a logic state of "00" to a logic state of "01". Additionally, the triplet memory cell group corresponding to bit line 606F has changed to the physical level of "233" because the memory cell at the intersection of bit line 606F and word lines 602B, 604B has changed from the logic state of "00" to a logic state of "01". Finally, the triplet memory cell group corresponding to bit line 606G has changed to the physical level of "332" because the memory cell at the intersection of bit line 606G and word lines 602B, 604B has changed from the logic state of "00" to the logic state of "10". To perform the burn process, a write current is applied to the upper page word line 602B and to the corresponding bit lines 606A, 606B, 606F and 606G to change the logic state of the corresponding bits. After the burn process, the RBER is increased to at least 0.0625. As noted above, a RBER of at most about 0.01 is considered to be correctable. Hence, the RBER is far above a correctable value. Additionally, the ECC rate for an RBER of 0.0625 is less than 0.67 which is far below the standard ECC of 0.9 and thus not decodable. In order to decode by treating the known files as "3?3", "2?3" and "3?2", then the ECC is still less than 0.8125 which is below 0.9. Hence, decoding the file is highly unlikely.

It is to be understood that while the description herein has been made in reference to an SLC and a MLC, the embodiments described herein are applicable to TLC, QLC and any other memory arrays. By physically destroying an entire word line after a file has been read, a file can be burned so that a hacker cannot decode the file.

While the foregoing is directed to embodiments of the present disclosure, other and further embodiments of the disclosure may be devised without departing from the basic scope thereof, and the scope thereof is determined by the claims that follow.

What is claimed is:

1. A method for use with a first memory device comprising a first file and a first bit coupled to a first word line, the first file comprising the first bit, the method comprising:
   determining that the first file has been read from the first memory device; and
   changing a logic state of the first bit after a first predetermined period of time, wherein the first word line, after changing the logic state, comprises a raw bit error rate that requires for correction an error correction code (ECC) rate of less than 0.9.

2. The method of claim 1, wherein the first memory device is a single level cell (SLC) memory device.

3. The method of claim 1, wherein the first memory device is a multi-level cell (MLC) memory device.

4. The method of claim 3, wherein changing a logic state comprises changing a logic state of a lower page of the MLC.

5. The method of claim 3, wherein changing a logic state comprises changing a physical state of the first bit to 3.

6. The method of claim 1, wherein the first memory device further comprises an additional bit coupled to a first word line, the first file comprises the additional bit, and wherein changing a logic state of the first bit additionally includes changing the logic state of the additional bit.

7. The method of claim 6, further comprising:
   searching for a predetermined pattern in the first memory device, wherein the predetermined pattern includes at least three bits, wherein a second bit of the three bits is disposed on a second word line separate from the first word line, wherein a third bit of the three bits is disposed on a third word line separate from both the first word line and the second word line and wherein the first word line is disposed between the second word line and the third word line.

8. The method of claim 1, wherein the first memory device has a raw bit error rate (RBER) of at least 0.0625.

9. A computer system for storing and retrieving files, comprising:
   a processor; and
   a memory system comprising a first memory device that includes a first file and a first bit coupled to a first word line, the first file comprising the first bit, the memory system storing instructions that, when executed by the processor, cause the computer system to:
   determine that the first file has been read from the first memory device; and
   change a logic state of the first bit after a first predetermined period of time, wherein the first word line, after changing the logic state, comprises a raw bit error rate that requires for correction an error correction code (ECC) rate of less than 0.9.

10. The computer system of claim 9, wherein the first memory device is an SLC memory device.

11. The computer system of claim 9, wherein the first memory device is an MLC memory device.

12. The computer system of claim 11, wherein change a logic state comprises changing a logic state of a lower page of the MLC.

13. The computer system of claim 11, wherein change a logic state comprises changing a physical state of the first bit to 3.

14. The computer system of claim 9, wherein the first memory device further comprises an additional bit coupled to a first word line, the first file comprises the additional bit, and wherein change a logic state of the first bit additionally includes changing the logic state of the additional bit.

15. The computer system of claim 14, further comprising:
   searching for a predetermined pattern in the first memory device, wherein the predetermined pattern includes at least three bits, wherein a second bit of the three bits is disposed on a second word line separate from the first word line, wherein a third bit of the three bits is disposed on a third word line separate from both the first word line and the second word line and wherein the first word line is disposed between the second word line and the third word line.

16. The computer system of claim 9, wherein the first memory device has a raw bit error rate (RBER) of at least 0.0625.

17. A non-transitory computer readable storage medium, containing instructions that, when executed by a processor, cause a computer system to burn files after a read process has been completed for a first memory device comprising a first file and a first bit coupled to a first word line, the first file comprising the first bit, by performing the steps of:
  determining that the first file has been read from the first memory device; and
  changing a logic state of the first bit after a first predetermined period of time, wherein the first word line, after changing the logic state, comprises a raw bit error rate that requires for correction an error correction code (ECC) rate of less than 0.9.

18. The storage medium of claim 17, wherein the first memory device is an SLC memory device.

19. The storage medium of claim 17, wherein the first memory device is an MLC memory device.

20. The storage medium of claim 19, wherein changing a logic state comprises changing a logic state of a lower page of the MLC.

21. The storage medium of claim 19, wherein changing a logic state comprises changing a physical state of the first bit to 3.

22. The storage medium of claim 17, wherein the first memory device further comprises an additional bit coupled to a first word line, the first file comprises the additional bit, and wherein changing a logic state of the first bit additionally includes changing the logic state of the additional bit.

23. The storage medium of claim 22, further comprising:
  searching for a predetermined pattern in the first memory device, wherein the predetermined pattern includes at least three bits, wherein a second bit of the three bits is disposed on a second word line separate from the first word line, wherein a third bit of the three bits is disposed on a third word line separate from both the first word line and the second word line and wherein the first word line is disposed between the second word line and the third word line.

24. The storage medium of claim 17, wherein the first memory device has a raw bit error rate (RBER) of at least 0.0625.

25. A first memory device comprising:
  a first file and a first bit coupled to a first word line, the first file comprising the first bit;
  means for determining that the first file has been read from the first memory device; and
  means for changing a logic state of the first bit after a first predetermined period of time, wherein the first word line, after changing the logic state, comprises a raw bit error rate that requires for correction an error correction code (ECC) rate of less than 0.9.

26. The device of claim 25, wherein the first memory device is a single level cell (SLC) memory device.

27. The device of claim 25, wherein the first memory device is a multi-level cell (MLC) memory device.

28. The device of claim 27, wherein changing a logic state comprises changing a logic state of a lower page of the MLC.

29. The device of claim 27, wherein changing a logic state comprises changing a physical state of the first bit to 3.

30. The device of claim 25, wherein the first memory device further comprises an additional bit coupled to a first word line, the first file comprises the additional bit, and wherein the means for changing a logic state of the first bit additionally includes means for changing the logic state of the additional bit.

31. The device of claim 30, further comprising:
  means for searching for a predetermined pattern in the first memory device, wherein the predetermined pattern includes at least three bits, wherein a second bit of the three bits is disposed on a second word line separate from the first word line, wherein a third bit of the three bits is disposed on a third word line separate from both the first word line and the second word line and wherein the first word line is disposed between the second word line and the third word line.

32. The device of claim 25, wherein the first memory device has a raw bit error rate (RBER) of at least 0.0625.

* * * * *